US012170420B2

(12) United States Patent
Droesbeke et al.

(10) Patent No.: US 12,170,420 B2
(45) Date of Patent: Dec. 17, 2024

(54) ELECTRICAL CONNECTOR FOR AUTOMOTIVE APPLICATIONS AND METHOD OF ASSEMBLING THEREOF

(71) Applicant: Aptiv Technologies AG, Schaffhausen (CH)

(72) Inventors: Gert Droesbeke, Erkrath (DE); Paul Pigmans, Tilburg (NL); Manoharan Srinivasan, Chennai (IN)

(73) Assignee: Aptiv Technologies AG, Schaffhausen (CH)

(*) Notice: Subject to any disclaimer, the term of this patent is extended or adjusted under 35 U.S.C. 154(b) by 187 days.

(21) Appl. No.: 17/719,739

(22) Filed: Apr. 13, 2022

(65) Prior Publication Data

US 2022/0328998 A1 Oct. 13, 2022

(30) Foreign Application Priority Data

Apr. 13, 2021 (EP) .................................... 21168031

(51) Int. Cl.

| | |
|---|---|
| ***H01R 13/50*** | (2006.01) |
| ***H01R 13/24*** | (2006.01) |
| ***H01R 13/504*** | (2006.01) |
| ***H01R 13/627*** | (2006.01) |
| ***H01R 13/6591*** | (2011.01) |
| ***H01R 43/24*** | (2006.01) |

(52) U.S. Cl.
CPC ..... *H01R 13/5045* (2013.01); *H01R 13/2464* (2013.01); *H01R 13/6271* (2013.01); *H01R 13/65915* (2020.08); *H01R 43/24* (2013.01); *H01R 2201/26* (2013.01)

(58) Field of Classification Search
CPC ........... H01R 13/5045; H01R 13/2464; H01R 13/6271; H01R 13/65915; H01R 43/24; H01R 2201/26; H01R 43/16; H01R 13/405; H01R 13/02; H01R 13/46
See application file for complete search history.

(56) References Cited

U.S. PATENT DOCUMENTS 5,399,110 A * 3/1995 Morello ................. H01R 4/185 439/879
7,744,380 B2 6/2010 Shuey et al.
8,506,336 B2 * 8/2013 Oh ......................... H01R 43/16 439/852

(Continued)

FOREIGN PATENT DOCUMENTS

CN 107248632 A 10/2017
CN 206673149 U 11/2017

(Continued)

*Primary Examiner* — Truc T Nguyen
(74) *Attorney, Agent, or Firm* — Billion & Armitage

(57) ABSTRACT

The application deals with a male or female connector for automotive applications with at least one signal contact having an elongated male pin or a female signal contact portion; wherein a section of the signal contact is covered by a molded part that is manufactured by overmolding the section of the signal contact. The application further deals with a method for producing a male or female connector for automotive applications; including the steps of providing at least one signal contact having an elongated pin or a female signal contact portion; and overmolding a section of the at least one signal contact.

12 Claims, 13 Drawing Sheets

(56) References Cited

U.S. PATENT DOCUMENTS

| | | | | |
|---|---|---|---|---|
| 10,431,920 | B1 * | 10/2019 | Tate | H01R 12/7064 |
| 2004/0043674 | A1 * | 3/2004 | Dunne | H01R 43/16 439/847 |
| 2009/0075524 | A1 * | 3/2009 | Imai | H01R 12/592 439/676 |
| 2015/0004813 | A1 | 1/2015 | Heppner et al. | |
| 2015/0222037 | A1 * | 8/2015 | Bulmer | H01R 13/113 439/660 |
| 2017/0214191 | A1 * | 7/2017 | Lane | H01R 13/426 |
| 2020/0006880 | A1 * | 1/2020 | Esmaeili | H01R 13/03 |

FOREIGN PATENT DOCUMENTS

| | | | | |
|---|---|---|---|---|
| DE | 0106992 | * | 5/1984 | H01R 43/16 |
| EP | 1786074 | A1 | 5/2007 | |
| EP | 3525288 | A1 | 8/2019 | |

* cited by examiner

Section A-A

SECTION A-A

SECTION B-B

SECTION D-D

SECTION C-C 620
614
614

620
614
621
614
621

612,614
612a
632
614a
612,614
612a
632
614a
615
617
613

ELECTRICAL CONNECTOR FOR AUTOMOTIVE APPLICATIONS AND METHOD OF ASSEMBLING THEREOF

CROSS-REFERENCE TO RELATED APPLICATION

This application claims benefit of priority to European Patent Application No. 21168031.9 filed on Apr. 13, 2021, the entire disclosure of which is hereby incorporated by reference.

TECHNICAL FIELD OF THE INVENTION

The present application relates to relates to an electrical connector for automotive applications and a method of assembling such an electrical connector for automotive applications, preferably for super high frequency (3-30 GHz) applications. In particular, the disclosure relates to a high speed modular twisted-pair-data connector, in particular a super high frequency differential pair connector, and to a method of assembling a high speed modular twisted-pair-data connector.

BACKGROUND

An example of a currently produced high speed modular twisted-pair-data connector is the H-MTD® connection system is produced by Rosenberger Hochfrequenztechnik GmbH & Co. KG. Connectors of this system are meant to allow data transmission up to 15 GHz or 20 Gbps while having a small package size. The H-MTD® system is used in 4K camera systems, autonomous driving, radar, lidar, high-resolution displays and rear seat entertainment systems.

There is a need for a male and female high speed modular twisted-pair-data connectors with smaller manufacturing tolerances regarding the position of a male contact pin or a female signal contact portion and a method of assembling such a connector in a manner suitable for mass production.

SUMMARY

The present disclosure provides male and female high speed modular twisted-pair-data connectors for automotive applications with at least one signal contact having an elongated male pin or an elongated female signal contact portion. A section of the signal contact is covered by a molded part that is manufactured by overmolding the section of the signal contact.

Overmolding a section of the at least one signal contact has shown to hold the elongated male pin of the male connector or the elongated female signal contact portion in position precisely so that manufacturing tolerances can be met. Furthermore, it has been shown that the male and female connector can be mass produced and can therefore be used for automotive mass-market production.

In order to hold the signal contact in position precisely in every direction, the section of the signal contact should be completely covered, i.e., covered along its complete circumference, by the molded part. The at least one elongated male pin is usually configured to be plugged into an opening of a corresponding female connector. Similarly, the at least one elongated female signal contact portion is usually configured to be connected to a corresponding male connector by receiving an elongated male pin of the connector.

Preferably, the molded part is formed by a non-conducting material, in particular by plastic.

According to an embodiment, the at least one signal contact of the male or female connector for automotive applications comprises a twisted section. The twisted section can be twisted around the longitudinal axis by at least 35°, in particular by approximately 90°. The twisted section has the effect that the signal contact including the male pin or female signal contact portion can be mass produced by coining and a good connectivity between the connector and a respective matching connector, e.g., a male and/or female high speed modular twisted-pair-data connectors, can be achieved.

According to an embodiment, the signal contact has at least one non-circular cross-section adjacent to the twisted section. In particular, the non-circular cross-section can be a rectangular cross-section. Such a non-circular, in particular rectangular, cross-section can be used for applying a tool to form the twisted section by twisting, i.e., applying a torsional force to, a section of a non-twisted signal contact.

According to a further embodiment, the signal contact has two non-circular cross-sections, wherein the two non-circular cross-sections are arranged on opposite sides of and adjacent to the twisted section. Preferably, the two non-circular cross-sections are arranged on opposite sides of and directly adjacent to the twisted section. That simplifies manufacturing the twisted section in that tools can be more securely applied on each end of the section that is going to be twisted.

According to an embodiment, the connector comprises at least two signal contacts arranged in parallel to one another. Preferably, the molded part covers a section of both signal contacts. This allows the molded part to hold the two signal contacts in position to each other which reduces skew and/or time delay. In particular, the molded part can fully cover, i.e., enclose, a section of both signal contacts along their circumferential surfaces. Furthermore, the molded part can be manufactured by simultaneously overmolding the two signal contacts in the section. In other words, the molded part can be manufactured by overmolding the two signal contacts in the section in one step.

According to an embodiment, the at least two signal contacts each comprise a twisted section. The twisted sections can be in corresponding locations, i.e., next to each other, along the respective signal contacts. Furthermore, the two signal contacts can be formed correspondingly to each other. In particular, both signal contacts can have corresponding non-circular cross-sections that can be used to apply a tool to form the twisted sections.

According to a further embodiment, the at least one twisted section is covered by the molded part. In particular, the at least one twisted section can be fully covered by the molded part. If there are two signal contacts having a twisted section, both twisted sections can be covered, in particular fully covered, by the molded part. This feature allows a compact design of the connector.

According to an embodiment, the at least one signal contact forms a rear end region being arranged perpendicular to the at least one elongated male pin or female signal contact portion. In particular, the at least one signal contact can be bent by about 90° so that a rear-end portion of the at least one signal contact extends in a direction perpendicular to the at least one elongated male pin or elongated female signal contact portion forming a front-end portion of the signal contact.

According to an embodiment, the at least one male pin is a coined pin, i.e., is formed by coining. Alternatively, the at least one pin is a stamped and rolled pin, i.e., is formed by stamping and afterwards rolling a stamped part to form the pin. In order to minimize mold flowing into the hollow male stamped and rolled pin, a barrier can be created, in particular by deforming at least a proximal section of the rolled pin. According to a further option, the pin is a solid pin electrically and mechanically connected to the signal contact. The solid pin can be connected to the signal contact via welding, in particular laser-welding or resistance-welding, or soldering. This allows a good surface of the pin improving connectivity between the male and female connector.

According to an embodiment, the at least one female signal contact portion forms an elongated inner space for receiving a male pin of a male connector. The at least one female signal contact portion can be a stamped female signal contact portion, i.e., can be formed by stamping. In particular, the at least one female signal contact portion can be a stamped and rolled female signal contact portion, i.e., can be formed by stamping and rolling. As discussed in regard to the male stamped and rolled pin, a barrier can be formed at a proximal end of the at least one female signal contact portion to block flow of liquid mold into the at least one female signal contact portion during the overmolding of the section of the signal contact. Alternatively, the at least one female signal contact portion can be a stamped and twisted female signal contact portion, i.e., can be formed by stamping and twisting. The at least one female signal contact portion could further be a coined female signal contact portion, i.e., could be formed by coining.

According to an embodiment, the at least one female signal contact portion has a tune fork-like shape. In other words, the at least one female signal contact portion forms two approximately longitudinally extending segments, a connecting segment connecting the two longitudinally extending segments at their respective proximal ends and a further longitudinally extending segment extending from the connecting segment in a proximal direction. The two approximately longitudinally extending segments are preferably elastically deformable. Furthermore, a distance between the two approximately longitudinally extending segments is preferably smaller than a respective thickness of a corresponding male pin so that the pin can be clamped between the two longitudinally extending segments. Generally, it is preferable if the male pin of the male connector and the female signal contact portion of the female connector form a press-fit connection when they are attached to each other.

According to an embodiment, the at least one female signal contact has a proximal end having a crimping portion for crimping the female signal contact to a wire. Preferably, the section forming the crimping portion is not over-molded, i.e., covered by the molded part.

According to an embodiment, the connector is a super high frequency differential pair connector. In particular, the connector can be a male or female high speed modular twisted-pair-data connector.

According to another aspect of the disclosure, a method for producing a male or female connector for automotive applications is provided, the method including the steps of providing at least one signal contact having an elongated male pin or an elongated female signal contact portion; and overmolding a section of the at least one signal contact.

According to an embodiment, the method comprises twisting the signal contact in a section. Preferably, the signal contact is twisted around its longitudinal axis by at least 35°, in particular by about 90°. Preferably, twisting the signal contact can be done by a tool that engages with at least one non-circular section of the signal contact and that is then rotated along a main axis, i.e., the longitudinal axis, of the signal contact.

According to a further embodiment, the twisted section is overmolded to create a molded part covering the twisted section.

Furthermore, according to another embodiment, the at least one male pin is formed by coining. In particular, the whole signal contact can be formed by coining. Alternatively, the at least one pin is formed by stamping and rolling. According to a third option, the at least one pin is a solid pin which is mechanically and electrically connected to the remaining contact signal, preferably by laser-welding.

If the connector is a female connector, the at least one elongated female signal contact portion can be formed by stamping. In particular, the at least one elongated female signal contact portion can be formed by stamping and rolling. Alternatively, the at least one elongated female signal contact portion can be formed by stamping and twisting. Preferably, the at least one elongated female signal contact portion can be stamped so that it is formed like a tuning fork.

According to an embodiment, two signal contacts each having an elongated male pin or an elongated female signal contact portion are provided. In a second step, a section of each of the two signal contacts can be overmolded. While the two signal contacts are being overmolded, they can be mechanically linked or attached to each other. In particular, the two signal contacts can be formed from the same part and still be linked together after the forming of the two signal contacts and during overmolding. Afterwards, the two signal contacts can be electrically separated, i.e., insulated, from each other while the molded part holds the signal contacts in position to each other. This can be done by removing mechanically linking parts between the two signal contacts. This method allows to manufacture a male or female connector having two elongated pins or two elongated female signal contact portions being positioned precisely relative to each other and that will remain in that position under abuse forces.

BRIEF DESCRIPTION OF THE DRAWINGS

The present invention is now described, by way of example with reference to the accompanying drawings, in which.

DETAILED DESCRIPTION

Figure 1A:
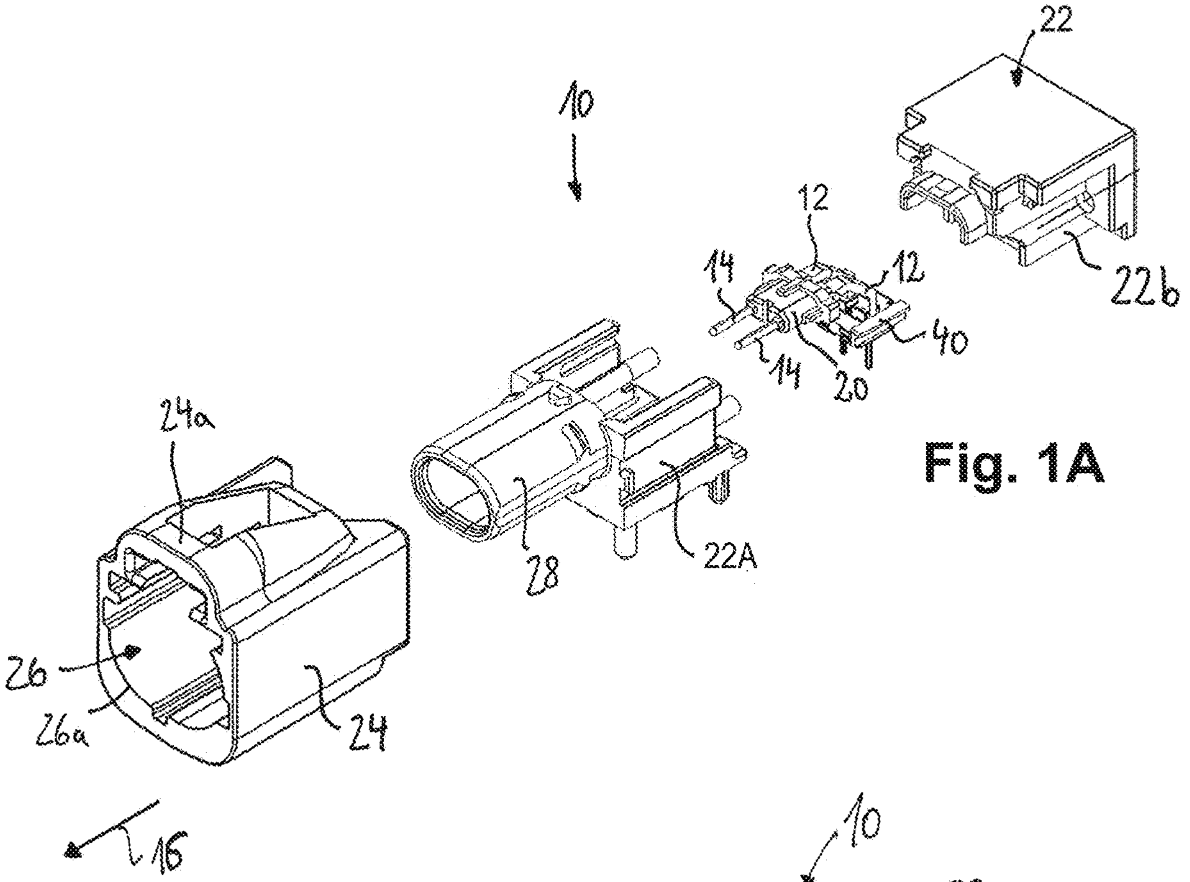
FIG. 1A is an exploded view of a male connector according to some embodiments.
Figure 1B:
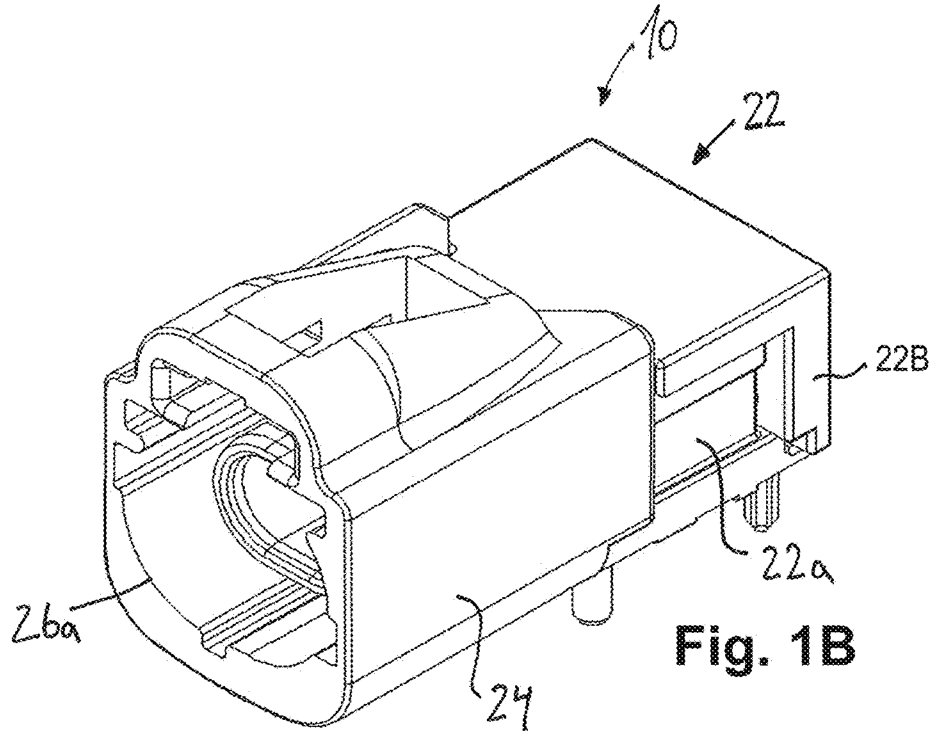
FIG. 1B is a view of the connector of FIG. 1A in an assembled state according to some embodiments.
Figure 2A:
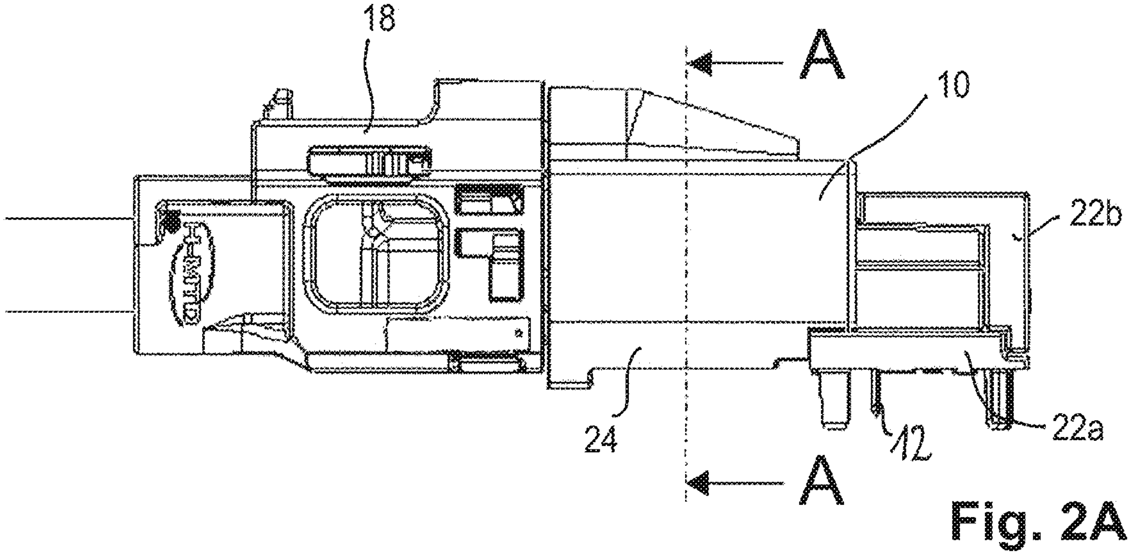
FIG. 2A is a side view of the connector of FIG. 1A connected to a female super high frequency differential pair connector according to some embodiments.
Figure 2B:
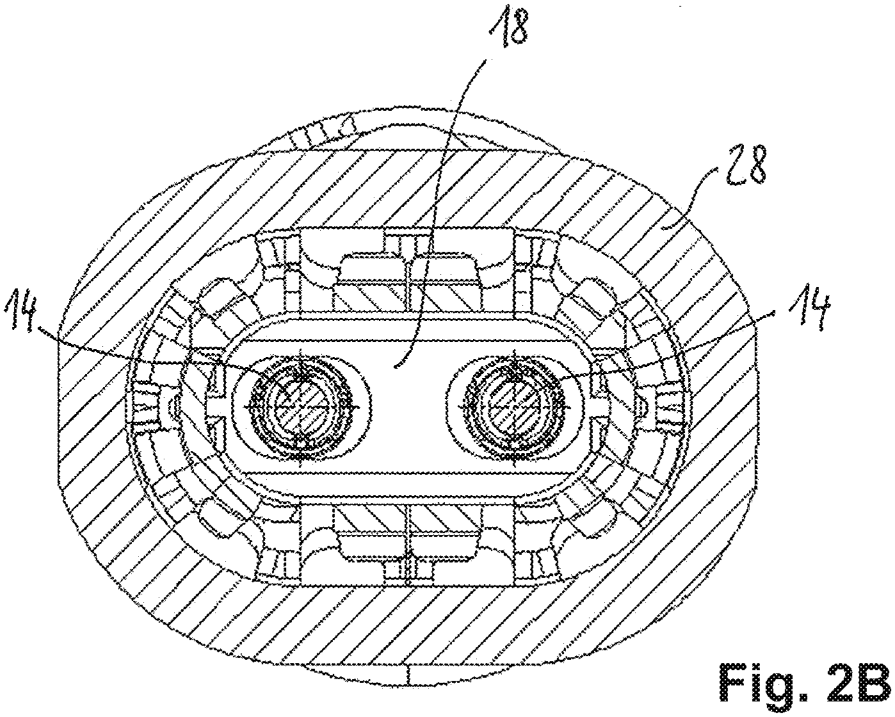
FIG. 2B is a cross-sectional view of the connector along section A-A of FIG. 2A according to some embodiments.

FIG. 1A depicts an exploded view of a male super high frequency differential pair connector 10. The male super high frequency differential pair connector 10 comprises two signal contacts 12. Each of the two signal contacts 12 has an elongated pin 14 extending in a mating direction 16 configured to be connected to a corresponding signal contact of a female super high frequency differential pair connector 18 (see FIG. 2A). The two signal contacts 12 are surrounded in a first section by a first molded part 20 and in a second section by a second molded part 40 that are manufactured by overmolding the respective sections of the signal contacts 12. The first section and the second section of each of the two signal contacts 12 are arranged perpendicular to each other. The overmolded signal contacts 12 are enclosed by a housing 22 having a front part 22*a* and a rear part 22*b* that are mechanically interconnected to form the housing 22. The housing 22 functions as a shield for the signal contacts 12 and an outer contact of the male connector 10. The housing 22 can be made out of tin-plated die-casted Zinc alloys such as ZAMAC 3 or ZAMAC 5. The signal contacts 12 are held in position relative to the housing 22 by the molded parts 20, 40 which are connected to the housing 22 in a form-fitting manner. In particular, the front part 22*a* of the housing 22 forms positioning surfaces that are in contact with positioning surfaces of the molded part 20 to hold the signal contacts 12 in position. However, the signal contacts 12 are not directly in physical contact with the housing 22.

Furthermore, the male connector 10 comprises a connecting part 24 that is mechanically connected to the front part 22*a* and that forms a mechanical fastening structure 24*a* to mechanically connect the male connector 10 to a female super high frequency differential pair connector via a snap-lock connection. In order to make sure that the male and female connectors 10, 18 are connected correctly, the connecting part 24 has a passage 26 with a non-circular opening 26*a* that allows connecting the male connector 10 to a female connector 18 only in one particular angular alignment.

Figure 3A:
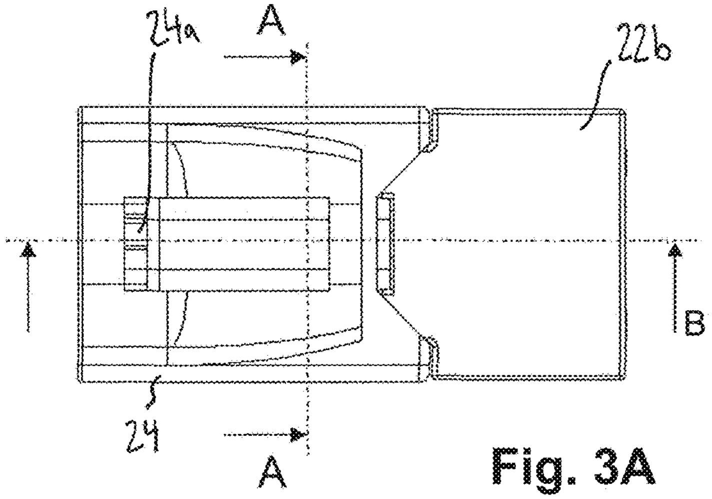
FIG. 3A is a top view of the connector of FIG. 1A according to some embodiments.
Figure 3B:
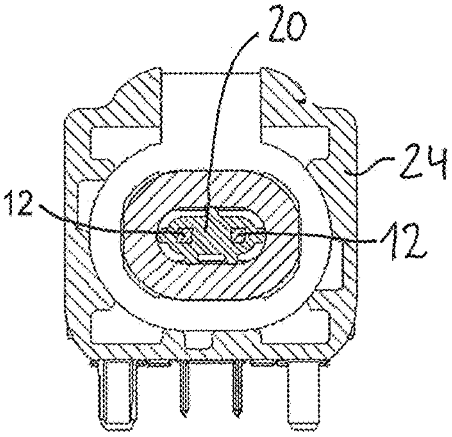
FIG. 3B is a cross-sectional view of the connector along section A-A of FIG. 3A according to some embodiments.
Figure 3C:
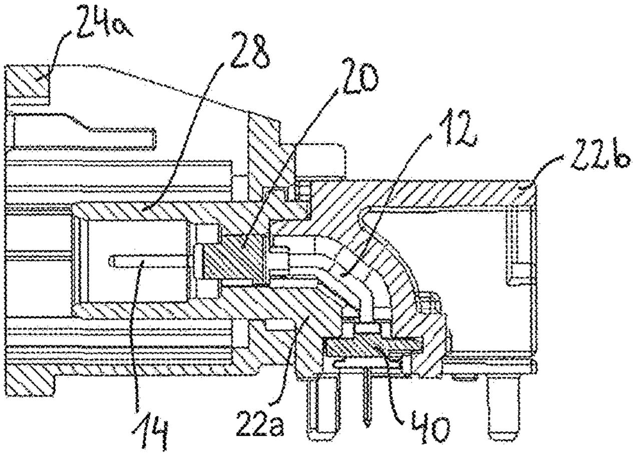
FIG. 3C is a cross-sectional view of the connector along section B-B of FIG. 3A according to some embodiments.
Figure 4A:
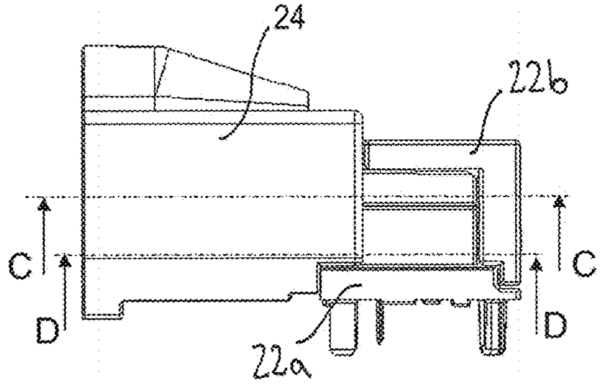
FIG. 4A is a side view of the connector of FIG. 1A according to some embodiments.
Figure 4C:
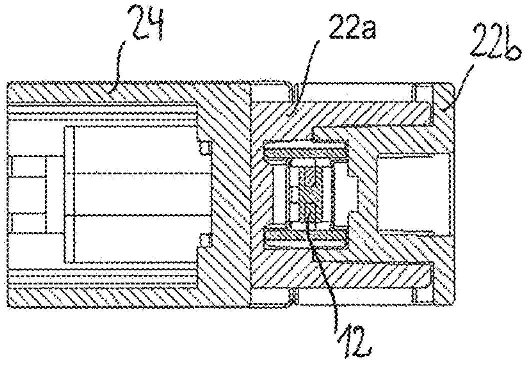
FIG. 4C is a cross-sectional view of the connector along section D-D of FIG. 4A according to some embodiments.
Figure 4B:
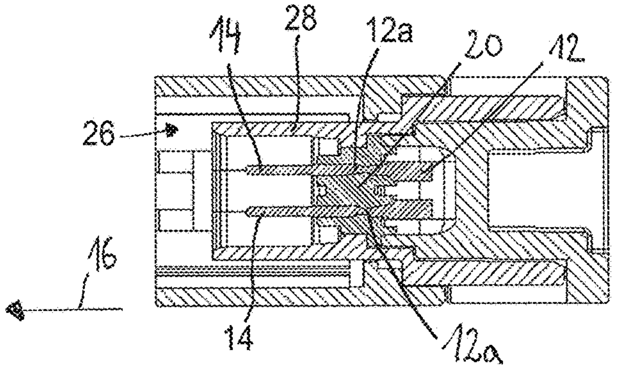
FIG. 4B is a cross-sectional view of the connector along section C-C of FIG. 4A according to some embodiments.

The front part 22*a* of the housing 22 has a tubular section 28 that—as can be best seen in FIG. 3C in connection with FIG. 4B—radially encloses the elongated pins 14. The tubular section 28 is radially enclosed by the connecting part 24.

Figures 5A, 5B, 5C, 5D:
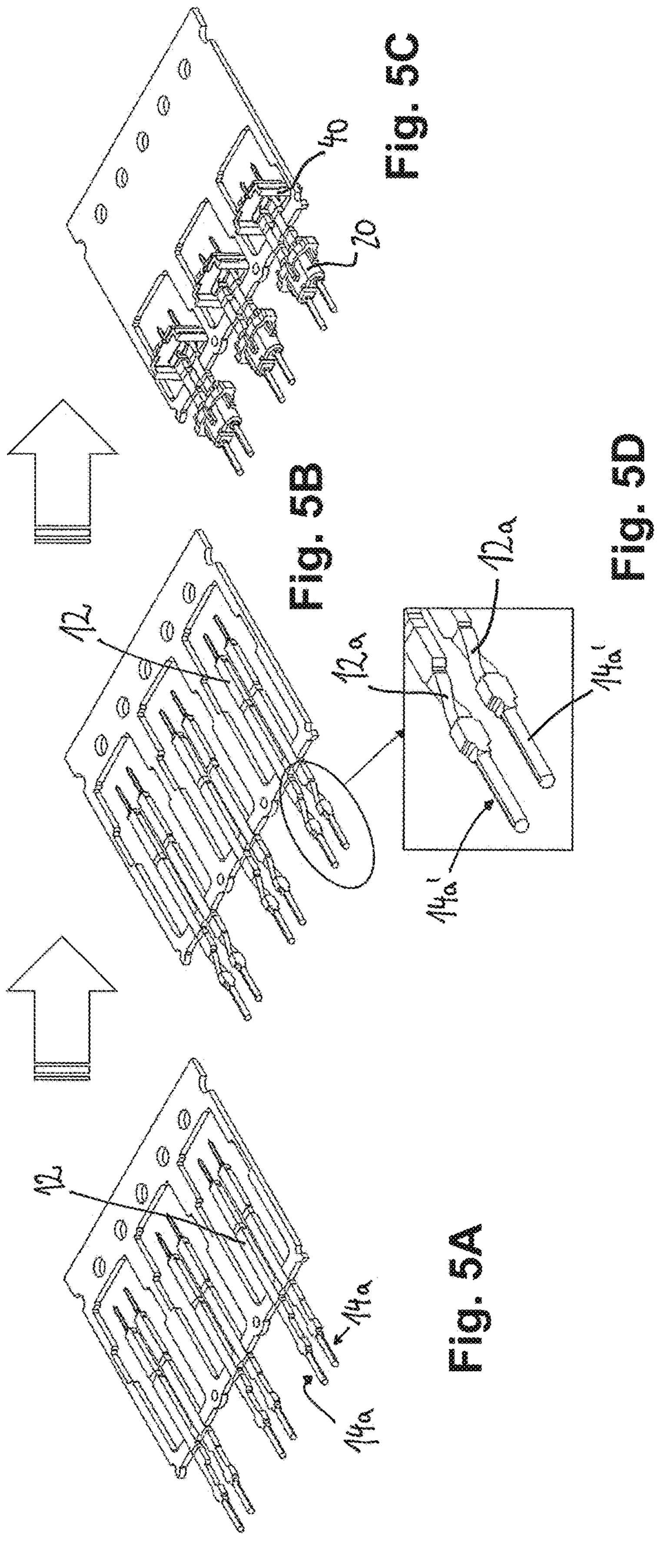
FIGS. 5A-5C show process steps for manufacturing signal contacts having a twisted and overmolded section according to some embodiments.
FIG. 5D is a close-up view of the process steps of FIG. 5B according to some embodiments.
Figure 6A:
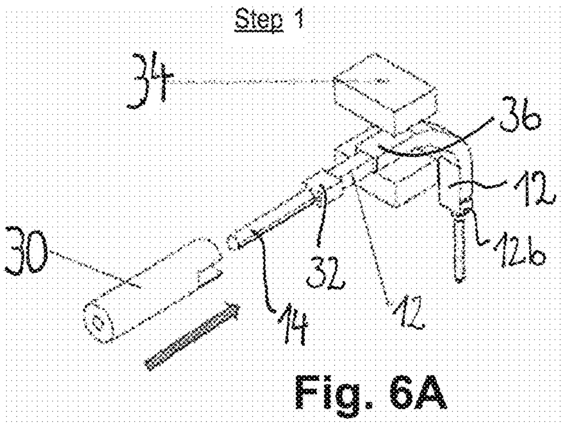
FIGS. 6A-6F show process steps for manufacturing the twisted section as shown in FIGS. 5A-5D according to some embodiments.
Figure 6B:
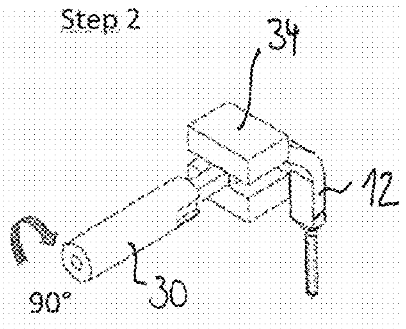
Figure 6C:
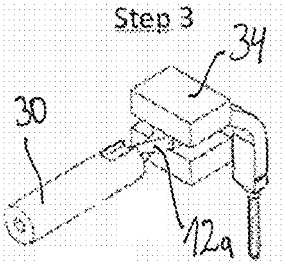
Figure 6D:
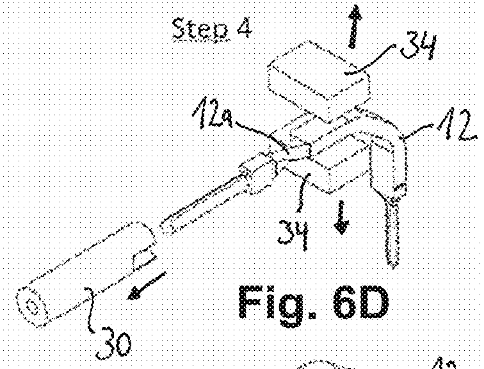
Figure 6E:
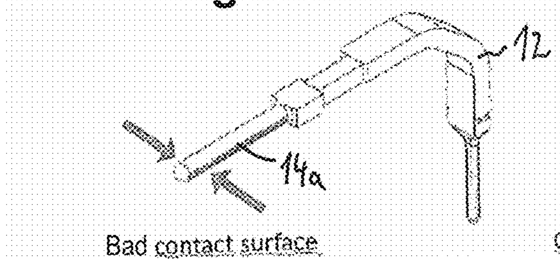
Figure 6F:
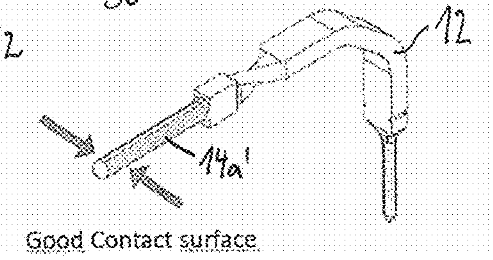

As can be seen in FIG. 4B, the signal contacts 12 have a twisted section 12*a*. The twisted section 12*a* extends in the same direction as the elongated pins 14, i.e., the mating direction 16. The twisted sections 12*a* are covered by the molded part 20. The manufacturing process for forming signal contacts 12 having a twisted section 12*a* is now explained in conjunction with FIGS. 5 and 6. First, the signal contacts 12 including the elongated pins 14 are coined out of sheet metal. Usually, if the elongated pins 14 are manufactured by coining, side surfaces 14*a* of the elongated pins 14 do not contact ideally to the corresponding surfaces of a female high speed modular twisted-pair-data connector 18. In order to improve connectivity, as can be seen in the middle of FIG. 5, the signal contacts 12 are being twisted by approximately 90° so that the bottom surface of the coined elongated pin 14 becomes a side surface 14*a*' of the elongated pin 14, one of the side surfaces 14*a* of the elongated pin 14 becomes the top surface, the top surface of the elongated pin 14 becomes one of the side surfaces 14*a*', and the other one of the side surfaces 14*a* becomes the bottom surface of the elongated pin 14. A process how to manufacture such a twisted section 12*a* is shown in FIG. 6.

In a first step, a first tool 30, e.g., a twist tube, is brought into a form-fitting engagement with a first rectangular portion 32 of the signal contact 12 and a second tool 34, i.e., a tool to hold a second rectangular portion 36 of the signal contact 12, is brought into a form-fitting engagement with the second rectangular portion 36. In a second step, the first tool 30, the twist tube, is rotated around its main axis by at least and/or approximately 90° rotating the first rectangular portion 32 of the signal contact 12 by at least and/or approximately 90° while the second tool 34 holds the second rectangular portion 36 in its original position. In step three, the twisting of the twisted section 12*a* is completed. In step four, the tools 30, 34 are being disengaged from the rectangular portions 32, 36 respectively. As described earlier, by twisting the signal contact 12, the former top and bottom surfaces of the pins 14 become the side surfaces 14*a*' that contact the respective surfaces of the female high speed modular twisted-pair-data connector better than the side surfaces 14*a* of the elongated pins of non-twisted signal contacts 12.

Figure 7A:
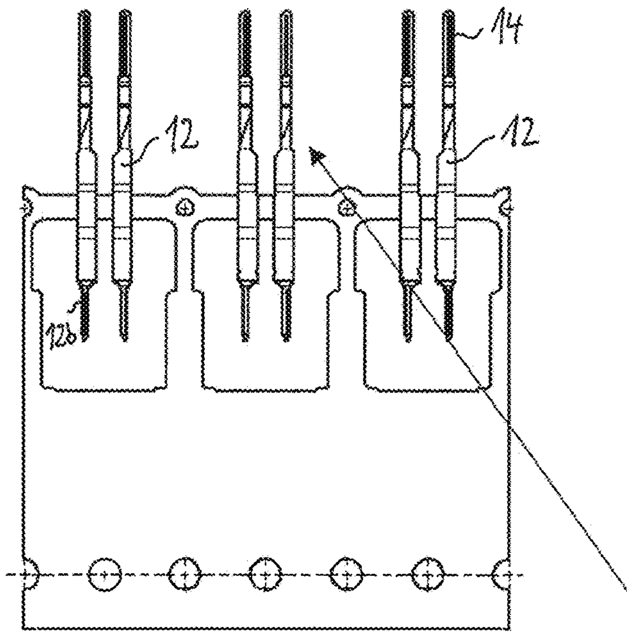
FIGS. 7A and 7B are views of contact zones of a female super high frequency differential pair connector according to some embodiments.
Figure 7B:
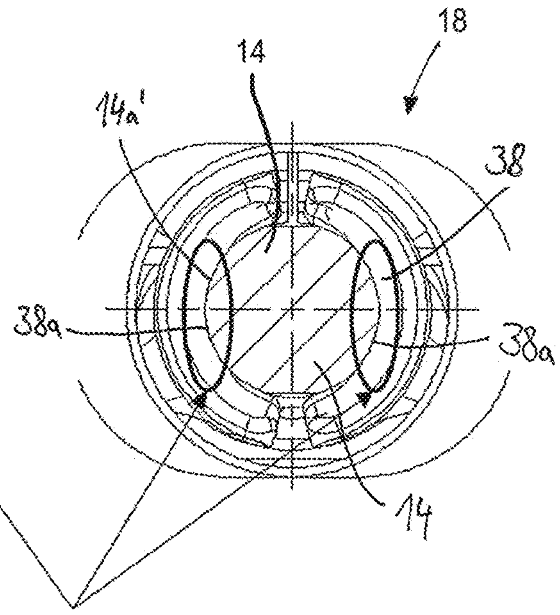

In FIG. 7, it is more clearly shown why the connection is improved by twisting the signal contacts 12. On the right side of FIG. 7, contact areas between the elongated pins 14 and signal contacts 38 of the female high speed modular twisted-pair-data connector are marked by ovals. These contact areas are located between inner side surfaces 38*a* of the signal contacts 38 of the female connector 18 and, if the signal contacts 12 of the male connector 10 are twisted, the outer side surfaces 14*a*' which are not damaged by the coining (see FIG. 5, left side) of the elongated pins 14.

After the twisted section 12*a* is formed, sections of the signal contacts 12 are being overmolded (see FIG. 5, right side) to form the molded parts 20 in a front section of the signal contacts 12 and molded parts 40 in a rear section 12*b* of the signal contacts 12. In order to do so, the signal contacts 12 are placed in a mold (not shown) and then liquid plastic material is put into the mold to form the molded parts 20 and 40. As can be seen in the figures, the signal contacts 12 can still be mechanically linked to each other when they are overmolded in order to keep their precise relative orientation during the molding process.

Figure 8C:
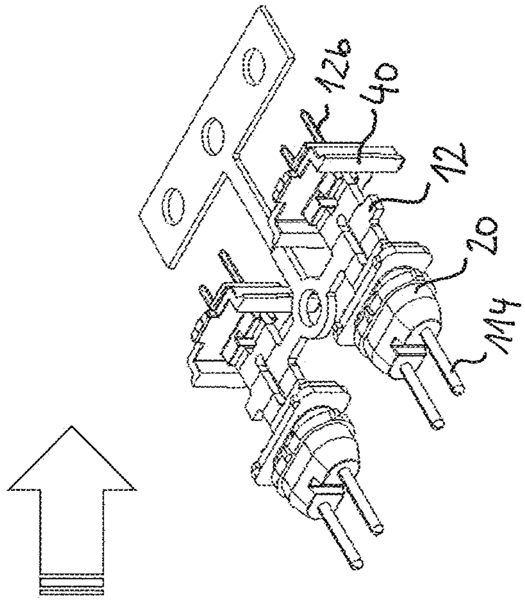
FIGS. 8A-8C show process steps for manufacturing signal contacts having stamped and rolled pins according to some embodiments.
Figure 8B:
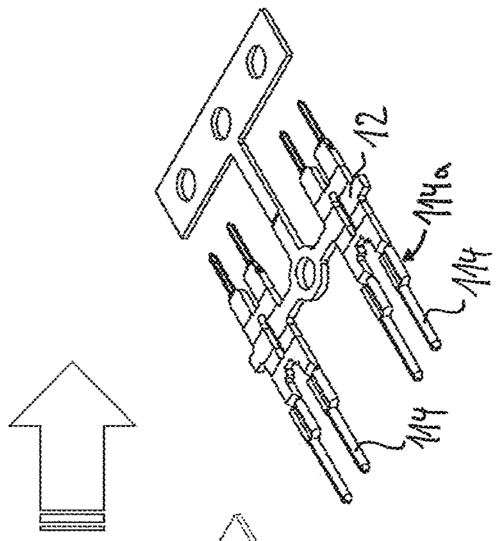
Figure 8A:
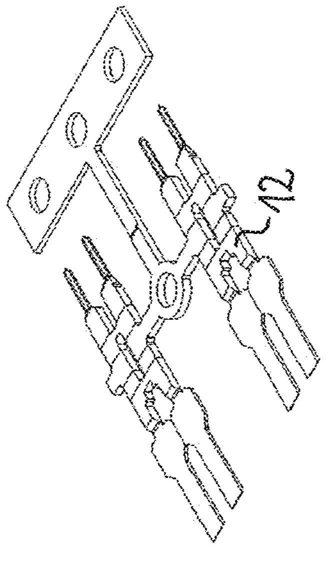
Figure 9A:
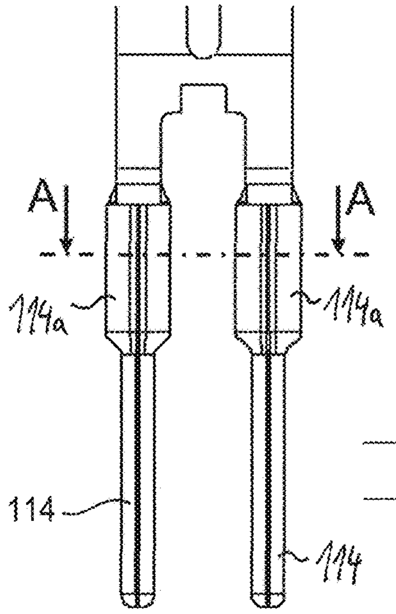
FIG. 9A is a detailed view of signal contacts having stamped and rolled pins manufactured in accordance with the process depicted in FIG. 8 according to some embodiments.
Figure 9B:
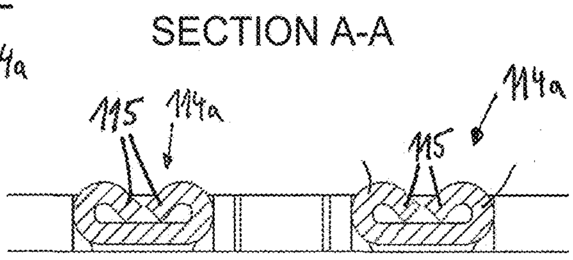
FIG. 9B is a sectional view of the stamped and rolled pins along section A-A of FIG. 9B according to some embodiments.
Figure 9C:
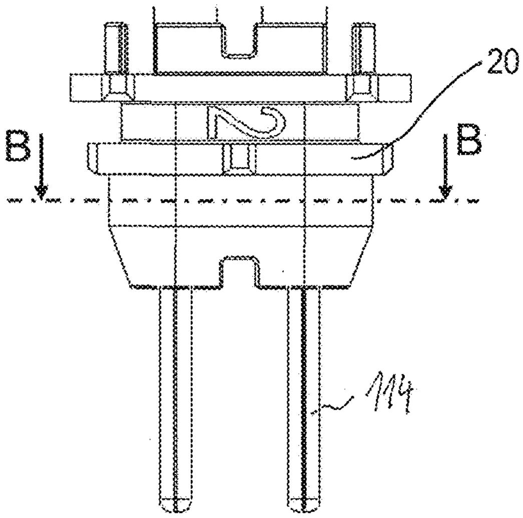
FIG. 9C is a detailed view of the signal contacts of FIG. 9A being covered by a molded part that is manufactured by overmolding sections of the signal contacts according to some embodiments.
Figure 9D:
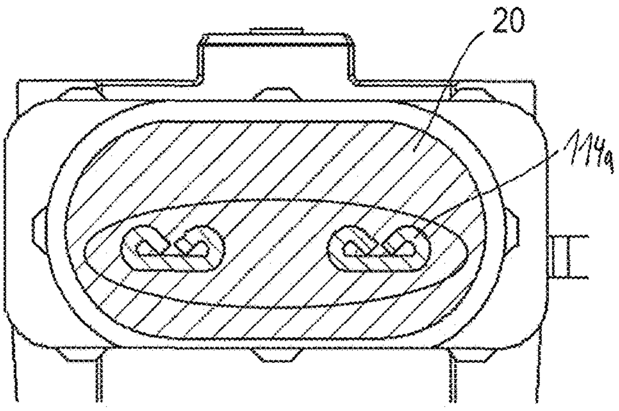
FIG. 9D is a sectional view of the signal contacts along section B-B of FIG. 9D according to some embodiments.
Figure 10A:
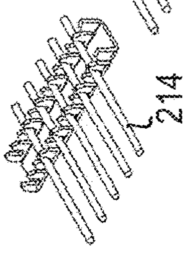
FIG. 10A-10E show process steps for manufacturing signal contacts having solid pins laser-welded to the remaining signal contacts according to some embodiments.
Figure 10B:
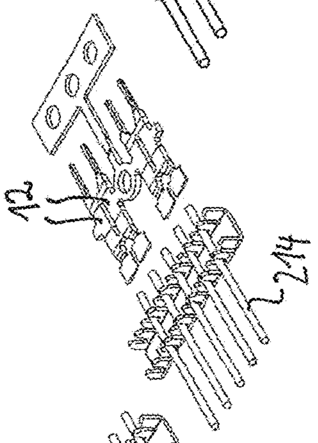
Figure 10C:
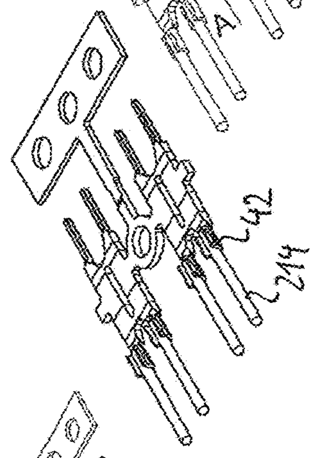
Figure 10D:
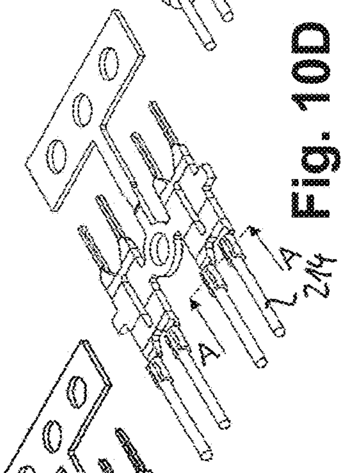
Figure 10E:
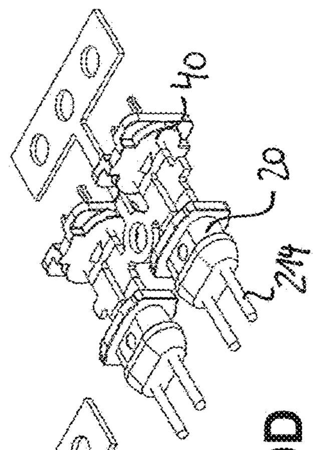
Figure 10F:
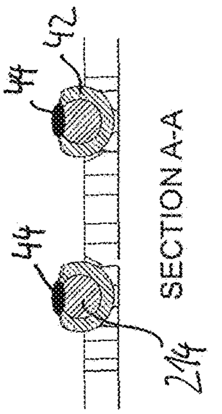
FIG. 10F is a cross-sectional view of the connector along section A-A of FIG. 10D according to some embodiments.

According to a second embodiment shown in FIGS. 8 and 9, the signal contacts 12 have stamped and rolled male pins 114. As can be seen on the left side of FIG. 8, parts are stamped out of a thin flat sheet metal. Next, as can be seen in the middle of FIG. 8, the pins 114 are formed by rolling the parts of thin sheet metal to form two semi-circular sections with the radial end edges abutting each other to form pins 114 having a circular cross-section. Afterwards, as can be seen on the right side of FIG. 8, the signal contacts 12 having stamped and rolled pins 114 are overmolded like the coined and twisted signal contacts 12 shown in FIG. 5. In this embodiment, generally, mold could flow into the stamped and rolled male pins 114 since they are hollow. However, if the hollow pins 114 are filled with mold, efficiency of the connector is decreased. In order to avoid mold flowing into the hollow stamped and rolled male pins 114, a proximal portion 114*a* of the stamped and rolled male pins 114 is formed so that the radial end edges extend into a middle section of the pins 114 to form a barrier 115 to stop mold from flowing into the pins 114.

According to a third embodiment shown in FIG. 10, the signal contacts 12 have solid pins 214 being laser-welded to the remaining signal contacts 12. As can be best seen in the sectional view of FIG. 10, a holding section 42 having a semi-circular cross-section is formed by bending a thin sheet metal part of each signal contact 12. Afterwards, one of the solid pins 214 is placed into each of the semi-circular holding sections 42. Then, the holding sections 42 are deformed further so that each of the holding sections 42 encloses its respective pin 214 by more than 180° around the circumference of the pin 214. Next, radial ends of the holding sections 42 are laser-welded to the solid pins 214 to establish a material connection between each holding section 42 and its respective solid pin 214 by a weld 44. After the welding step, the section of the signal contacts 12 forming the mechanical connection between the solid pins 214 and the respective holding sections 42 is overmolded, as is described earlier in conjunction with the embodiment of FIG. 5. Therefore, the molded part 20 covers the section of the signal contacts 12 where the solid pins 214 and the respective holding sections 42 are welded together.

Figure 11C:
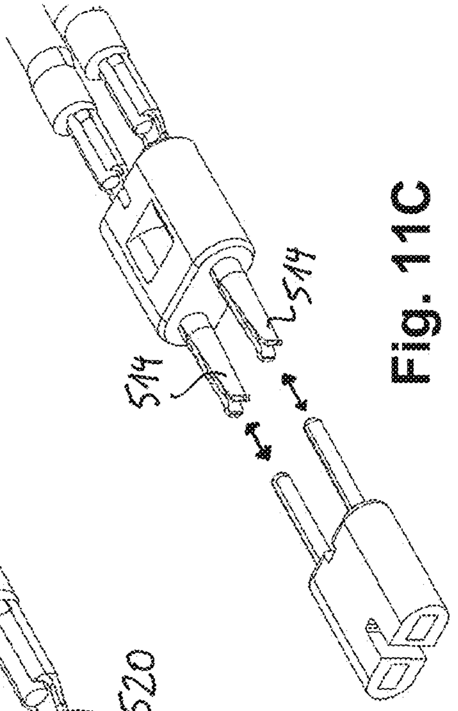
FIG. 11C is a view of the female signal contacts of FIG. 11B aligned with corresponding male contacts according to some embodiments.
Figure 11B:
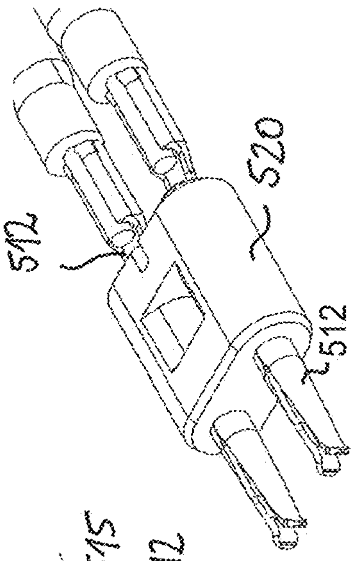
FIG. 11B is a view the female signal contacts of FIG. 11A being mechanically connected to each other by a molded part that is manufactured by overmolding sections of the signal contacts according to some embodiments.
Figure 11A:
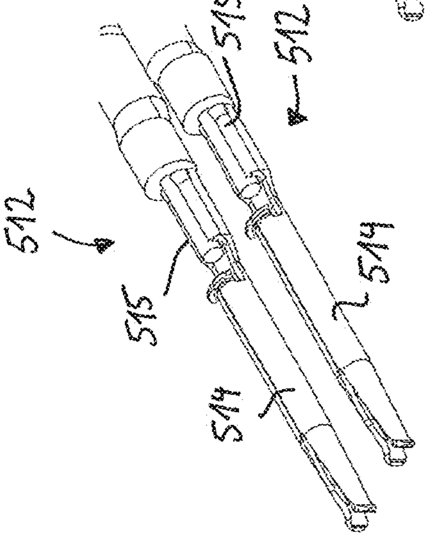
FIG. 11A is a perspective view of female signal contacts having stamped and rolled female signal contact portions according to some embodiments.

FIGS. 11A to 13C depict different embodiments of female signal contacts 512 which are part of a female connector (not fully shown). FIG. 11A depicts two female signal contacts 512 each having a female signal contact portion 514 which is manufactured by stamping and rolling sheet metal to form cylinder shaped female signal contact portions 514. The female signal contact portions 514 are arranged at a respective distal end of the female signal contacts 512. The two female signal contacts 512 further have a crimping portion 515 that is configured to crimp the respective female signal contact 512 to a signal wire. In FIG. 11B, a further manufacturing stage of the female connector is shown. Here, the female signal contact portions 514 are overmolded in a section to form a molded part 520. The molded part 520 can have one or more of the properties described regarding the molded part 20. In particular, the molded part 520 holds the two female signal contacts 512 positioned precisely relative, e.g., parallel, to each other, even under abuse forces. FIG. 11C depicts how the female signal contact portions 514 having overmolded sections are connected to respective male signal contacts also having overmolded sections, e.g., like the male connector 10 of FIGS. 1 to 10.

Figures 12A, 12B, 12C:
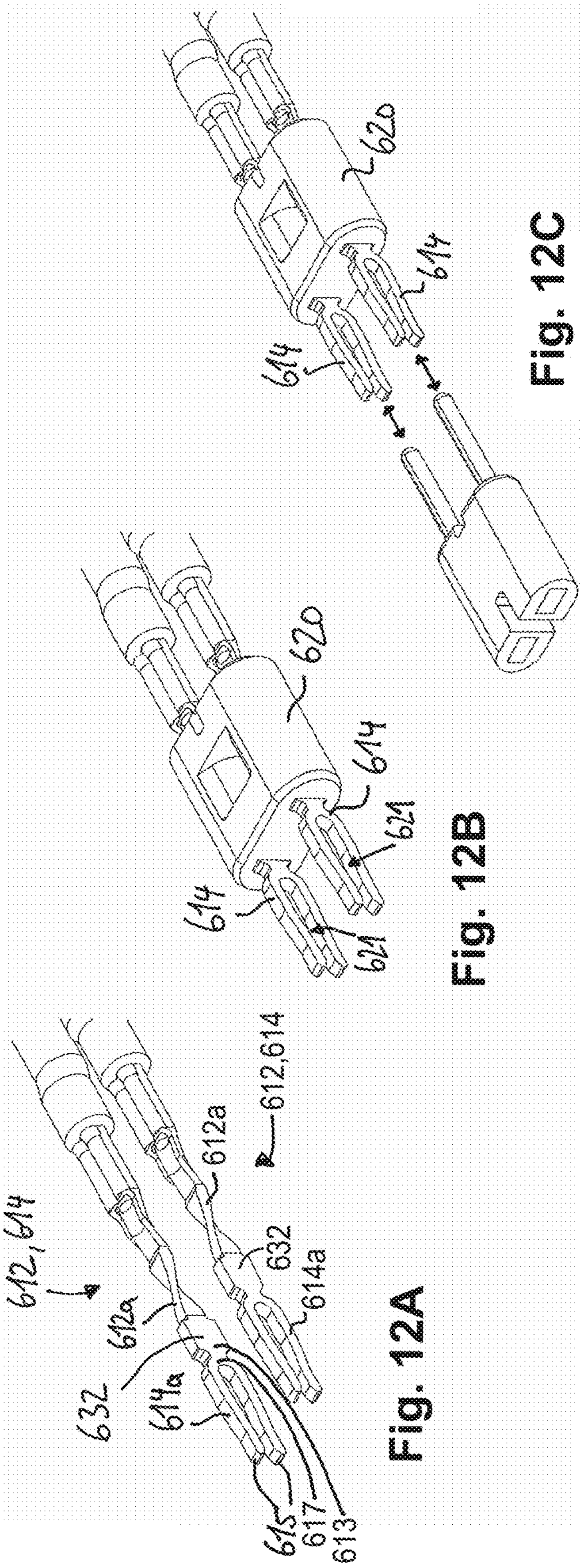
FIG. 12A is a perspective view of female signal contacts having stamped and twisted female signal contact portions according to some embodiments according to some embodiments.
FIG. 12B is a view of the female signal contacts of FIG. 12A being mechanically connected to each other by a molded part that is manufactured by overmolding the twisted sections of the signal contacts according to some embodiments.
FIG. 12C is a view of the female signal contacts of FIG. 12B aligned with corresponding male contacts according to some embodiments.

FIG. 12A depicts another embodiment of two female signal contacts 612. The two female signal contacts 612 each have a female signal contact portion 614 which is manufactured by stamping and twisting. In order to form a twisted section 612*a* easily, a non-round, in particular rectangular, section 632 is formed at a distal end of the twisted section 612*a*. The twisted section 612*a* is non-round. The female signal contact portions 614 comprise a tune fork-like shaped section 614*a* to connect each female signal contact 612 to a corresponding male contact. In other words, the female signal contact portions 614 each form two approximately longitudinally extending segments 615, a connecting segment 617 connecting the two longitudinally extending segments at their respective proximal ends and a further longitudinally extending segment 619 extending from the connecting segment in a proximal direction. The two approximately longitudinally extending segments 615 are elastically deformable and cantilevered. Furthermore, a distance between the two approximately longitudinally extending segments 615 is in sections smaller than a respective thickness of a corresponding male pin so that the pin can be clamped between the two elastically deformable longitudinally extending segments 615.

As can be seen from FIG. 12B, in a further production step the twisted sections 612*a* of the two female signal contacts 612 are overmolded to form a molded part 620. The molded part 620—like the molded part 520 of FIG. 11B—can have one or more of the properties described regarding the molded part 20. In particular, the molded part 620 holds the two female signal contacts 612 positioned precisely relative, e.g., parallel, to each other, even under abuse forces. FIG. 12C depicts how the female signal contact portions 614 having overmolded twisted sections 612*a* are connected to respective male signal contacts also having overmolded sections, e.g., like the male connector of FIGS. 1 to 10.

Figures 13A, 13B, 13C:
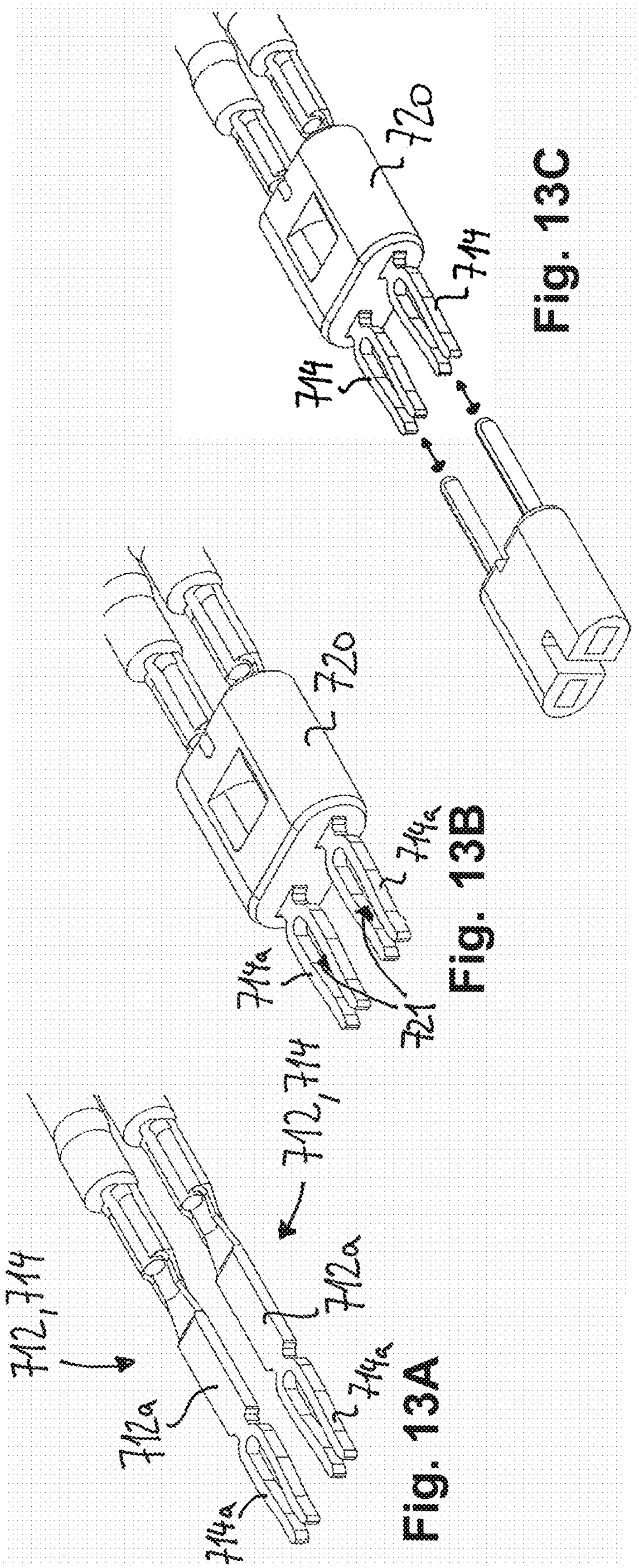
FIG. 13A is a perspective view of female signal contacts having stamped, but non-twisted female signal contact portions according to some embodiments.
FIG. 13B is a view of the female signal contacts of FIG. 13A being mechanically connected to each other by a molded part that is manufactured by overmolding sections of the signal contacts according to some embodiments.
FIG. 13C is a view of the female signal contacts of FIG. 13B aligned with corresponding male contacts according to some embodiments.

FIG. 13A to 13C depict a further embodiment of two female signal contacts 712 for a female connector (not shown). In contrast to the female signal contacts 612 shown in FIG. 12A, the two female signal contacts 712 do not have a twisted section 612*a*. Instead, the two female signal contacts 712 form plane sections 712*a*. As can be seen in FIG. 13B, the plane sections 712*a* are overmolded to form a molded part 720. Another difference between the embodiments shown in FIGS. 12A to 12C and FIGS. 13A to 13*c* is the orientation of the tune fork-like shaped sections 614*a* and 714*a*. While the tune fork-like shaped sections 614*a* form side openings 621 facing each other, which results in the tune fork-like shaped sections 614*a* contacting the respective male pins in an upper and lower region, the tune fork-like shaped sections 714*a* form openings 721 that face in the same direction, which results in the tune fork-like shaped sections 714*a* contacting the respective male pins of a male connector in side regions of the pins.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. An electrical connector configured for automotive applications, comprising:

a signal contact having a contact portion selected from a list consisting of a generally cylindrical elongated male pin formed by a coining process and a female tuning fork shape formed by the coining process, wherein the signal contact comprises a twisted section that is twisted around a longitudinal axis by at least 35 degrees and wherein the twisted section of the signal contact is covered by a molded part that is manufactured by overmolding the twisted section of the signal contact.

2. The electrical connector according to claim 1, wherein the male pin contact portion has at least one non-circular cross-section adjacent to the twisted section.

3. The electrical connector according to claim 2, wherein the male pin contact portion has two non-circular cross-sections and wherein the two non-circular cross-sections are arranged on opposite sides of and adjacent to the twisted section.

4. The electrical connector according to claim 1, further comprising at least two of the signal contacts arranged in parallel to one another, wherein the molded part covers the twisted section of both signal contacts, and the molded part is manufactured by simultaneously overmolding the twisted sections of the two signal contacts.

5. The electrical connector according to claim 1, wherein the signal contact forms a rear end region being arranged perpendicular to the at least one elongated pin.

6. The electrical connector according to claim 1, wherein the female signal contact portion is crimped to a wire.

7. The electrical connector according to claim 1, wherein a barrier is formed at a proximal end of the contact portion to block flow of liquid plastic material into the contact portion during the overmolding of the twisted section of the signal contact.

8. The electrical connector according to claim 1, wherein the contact portion has two opposed curved surfaces and two opposed generally flat surfaces.

9. A method for producing a connector for automotive applications, comprising:

forming a signal contact having a contact portion, wherein the contact portion is formed using a coining process;

twisting a section of the signal contact adjacent the contact portion around its longitudinal axis by at least 35 degrees, thereby forming a twisted section; and forming a molded part by overmolding the twisted section.

10. The method according to claim 9, wherein the twisted section is formed by a tool that engages with a non-circular section of the signal contact and that is then rotated along a main axis of the signal contact.

11. The method for according to claim 9, wherein the contact portion has a shape selected from a list consisting of a generally cylindrical male pin shape and a female tuning fork shape.

12. The method for according to claim 11, wherein the coining process forms the male pin shape such that it has two opposed curved surfaces and two opposed generally flat surfaces.

* * * * *